(12) United States Patent
Shepherd et al.

(10) Patent No.: US 8,612,280 B2
(45) Date of Patent: Dec. 17, 2013

(54) SELECTION OF PERFORMANCE INDICATORS FOR WORKFLOW MONITORING

(75) Inventors: Michael David Shepherd, Ontario, NY (US); Barry Glynn Gombert, Rochester, NY (US); Neil Robert Sembower, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1955 days.

(21) Appl. No.: 11/557,124

(22) Filed: Nov. 7, 2006

(65) Prior Publication Data

US 2008/0109270 A1    May 8, 2008

(51) Int. Cl.
*G06Q 10/00* (2012.01)
*G06Q 10/10* (2012.01)

(52) U.S. Cl.
CPC .................................. *G06Q 10/103* (2013.01)
USPC ....................................................... 705/7.27

(58) Field of Classification Search
None
See application file for complete search history.

(56) References Cited

U.S. PATENT DOCUMENTS

| | | | |
|---|---|---|---|
| 6,502,087 B1 | 12/2002 | Tsuiki et al. | |
| 6,509,974 B1 * | 1/2003 | Hansen | 358/1.12 |
| 6,678,698 B2 | 1/2004 | Fredell et al. | |
| 6,728,947 B1 * | 4/2004 | Bengston | 717/103 |
| 6,975,416 B2 * | 12/2005 | Tomita | 358/1.13 |
| 6,990,636 B2 | 1/2006 | Beauchamp et al. | |
| 7,064,848 B2 * | 6/2006 | Jackson et al. | 358/1.13 |
| 7,171,373 B2 * | 1/2007 | Lahey et al. | 705/7.26 |
| 7,234,140 B2 * | 6/2007 | Dortmans | 718/100 |
| 7,299,244 B2 * | 11/2007 | Hertling et al. | 707/694 |
| 7,375,842 B2 * | 5/2008 | Kloosterman et al. | 358/1.18 |
| 7,406,357 B2 * | 7/2008 | Ocke et al. | 700/97 |
| 7,408,658 B2 * | 8/2008 | Twede | 358/1.15 |
| 7,454,397 B2 * | 11/2008 | Ocke | 706/47 |
| 7,589,851 B2 * | 9/2009 | De Bie et al. | 358/1.15 |
| 7,647,432 B2 * | 1/2010 | Sasaki et al. | 710/8 |
| 7,734,492 B2 * | 6/2010 | Sun et al. | 705/7.12 |
| 2002/0071134 A1 * | 6/2002 | Jackson et al. | 358/1.13 |
| 2002/0073161 A1 | 6/2002 | Yamazaki et al. | |
| 2002/0116439 A1 * | 8/2002 | Someshwar et al. | 709/104 |
| 2003/0033167 A1 | 2/2003 | Arroyo et al. | |
| 2003/0128392 A1 * | 7/2003 | O'Brien et al. | 358/1.18 |
| 2003/0174347 A1 * | 9/2003 | Gonzalez et al. | 358/1.6 |
| 2003/0189724 A1 * | 10/2003 | Kloosterman et al. | 358/1.18 |
| 2003/0189725 A1 * | 10/2003 | Kloosterman et al. | 358/1.18 |
| 2003/0189726 A1 * | 10/2003 | Kloosterman et al. | 358/1.18 |
| 2003/0189727 A1 * | 10/2003 | Kloosterman et al. | 358/1.18 |
| 2004/0088647 A1 | 5/2004 | Miller et al. | |
| 2004/0098284 A1 | 5/2004 | Petito et al. | |
| 2004/0111430 A1 * | 6/2004 | Hertling et al. | 707/104.1 |
| 2004/0190057 A1 * | 9/2004 | Takahashi et al. | 358/1.15 |
| 2004/0196470 A1 * | 10/2004 | Christiansen | 358/1.1 |

(Continued)

OTHER PUBLICATIONS

Xerox Magazine. Autumn 2004. 1-20.*

(Continued)

*Primary Examiner* — Brett Feeney
(74) *Attorney, Agent, or Firm* — Fox Rothschild LLP

(57) ABSTRACT

A method of monitoring workflow performance includes selecting a workflow for a job in a production process environment, wherein the job corresponds to a job category. The method also may include accessing a knowledge base to automatically select a set of performance indicators that correspond to the job category. Process parameters corresponding to the production process are displayed, and at least a portion of the displayed process parameters include the selected performance indicators.

15 Claims, 4 Drawing Sheets

(56) References Cited

U.S. PATENT DOCUMENTS

| | | | |
|---|---|---|---|
| 2004/0207862 A1* | 10/2004 | Such et al. | 358/1.9 |
| 2005/0015711 A1* | 1/2005 | Yamamoto et al. | 715/500 |
| 2005/0213132 A1* | 9/2005 | Uejo | 358/1.13 |
| 2005/0256818 A1* | 11/2005 | Sun et al. | 706/46 |
| 2006/0044585 A1* | 3/2006 | Kaneko | 358/1.13 |
| 2006/0080616 A1* | 4/2006 | Vogel et al. | 715/769 |
| 2006/0130687 A1* | 6/2006 | Weichmann | 101/365 |
| 2006/0139679 A1* | 6/2006 | Barry et al. | 358/1.13 |
| 2006/0170996 A1* | 8/2006 | Headley et al. | 358/518 |
| 2006/0242002 A1* | 10/2006 | Sun et al. | 705/11 |
| 2006/0242097 A1 | 10/2006 | Gu et al. | |
| 2006/0253213 A1* | 11/2006 | Ocke et al. | 700/97 |
| 2007/0008557 A1* | 1/2007 | Harrington et al. | 358/1.9 |
| 2007/0013959 A1* | 1/2007 | Miwa | 358/304 |
| 2007/0094211 A1* | 4/2007 | Sun et al. | 706/50 |
| 2007/0236708 A1* | 10/2007 | Jahn et al. | 358/1.6 |
| 2008/0084574 A1* | 4/2008 | McDonald et al. | 358/1.15 |
| 2008/0259379 A1* | 10/2008 | Shepherd | 358/1.15 |
| 2009/0216703 A1* | 8/2009 | Shepherd et al. | 706/50 |

OTHER PUBLICATIONS

Xerox Web Document Submission Software. Workflow Guide. Jan. 2003. 1-32.*
Xerox FreeFlow Print Server 6.0. Software Documentation Package. 1-14.*
Strategies for Streamlining Digital Document Workflow. Oce. Oct. 2002. 1-12.*
SAP ArchiveLink—Storage Scenarios PM. Release 4.6B. SAP. 2000. 1-35.*
Prisma for PoD. Oce. 2004. 1-8.*
Production Owrkflow Solutions for Monochrome and Process Coloi Printing. Kodak versamark. Jan. 2005. 1-8.*
Badan A, Hodkin S, Hofstetter J, Kutschera G, Shaffer B and Smith W. IBM AS/400 Printing V. IBM Redbooks. Oct. 2000. 1-446.*
Hofstetter J, Hodkin S and Shnier M. IBM e server iSeries Priting Vi. Delivering the Output of e-business. IBM Redbooks. May 2002. 1-390.*
Heidelberg A and Roland M (2000). Job Definition Format (JDF). An Open, Multi-Vendor Solution. May 14, 2000. 1-8.*
Espoo PK (2006). Exploiting JDF between customer and print-shop. Helsinki University of Technology. 1-95. Document was protected and may be electronically accessed at: http://owww.media.hut.fi/~julkaisut/diplomityot/DI_P_Kulkarni_2006.pdf.*
Workflow for the New Business of Printing. FreeFlow White Paper. Interquest for Xerox. 2004. 1-26.*
The Global Print Production Workflow market: Enabling Fundamental Business Change in Graphic Arts. InfoTrends CAP Ventures. 2004. 1-6.*
Horridge, Matthew et al, "A Practical Guide to Building OWL Ontologies Using the Protege-OWL Plugin and CO-ODE Tools" Edition 1.0, The University of Manchester, Aug. 27, 2004, pp. 1-117.

* cited by examiner

SELECTION OF PERFORMANCE INDICATORS FOR WORKFLOW MONITORING

BACKGROUND

1. Technical Field

The present disclosure generally relates to systems and methods for monitoring a process workflow, such as a workflow in a document processing environment.

2. Background

Print shops can include any environment in which multiple document production devices are networked or configured to provide a document assembly environment within which documents can be printed, cut, finished, coated, bound, assembled, or otherwise created to form a variety of document types. Workflows have commonly been used to provide a structured process for document creation in such an environment. A workflow is a process that uses electronic systems to manage and monitor business processes, thus allowing the flow of work between individuals, devices and/or departments to be defined and tracked. A workflow can include the operational aspects of a work process: how tasks are structured, who or what device performs them, what is the relative order of various tasks, how tasks are synchronized, how information flows to support the tasks and how tasks are being tracked.

In particular, a workflow can be used to describe the movement of a document through a process. A workflow is a predefined plurality of operations used to approve, verify, modify and/or otherwise process a document. These operations can include processing of an electronic file before printing. Such operations can include file conversion, file merging, missing font detection, graphic resolution checking, error notification, print previewing, automatic job ticket creation, automatic production ticket creation, impositions, page annotations, document bar coding, page ordering, archiving and/or print routing. The operations also can include processing a physical document on which content is printed.

A typical job and/or workflow scheduling problem in document production environments assigns jobs to resources and orders the jobs to achieve an optimization objective, such as minimizing the total turnaround time, ensuring that no jobs complete later than a defined time, or to accomplish other goals. In order to monitor the progress of a job in a production environment such as a printing environment, indicators of job performance and status must be identified and monitored. These indicators may vary based on the type of job or other factors within the printing environment. It is desired to find improved ways of identifying performance indicators to be monitored in a production environment such as a print shop.

The embodiments described herein relate to attempts to solve one or more of the problems described above.

SUMMARY

In an embodiment, a method of monitoring workflow performance includes selecting a workflow for a job in a production process environment, where the job corresponds to a job category. The method also may include accessing a knowledge base to automatically select a set of performance indicators that correspond to the job category, displaying process parameters corresponding to the production process on a dashboard so that at least a portion of the displayed process parameters include the selected performance indicators, and performing the job in the production process environment. The method also may include receiving a desired process parameter selection for the job from all operator, and modifying the knowledge base so that the performance indicators corresponding to the job category include the desired process parameter selection. The method also may include receiving a job type selection before the workflow is selected, and wherein the selected workflow corresponds to the job type. Optionally, the displaying may include offering an operator both an option to display a set of parameters corresponding to the entire production process environment and an option to display a set of parameters corresponding to an individual resource within the entire production process environment.

Optionally, the selection of the workflow and before the selection of performance indicators, the method may include presenting an operator with a plurality of process options, a process option selection from the operator, modifying the workflow to yield a modified workflow that includes the process option selection, and determining whether the modified workflow corresponds to a different job category, and if so, reclassifying the job into the different job category so that the job category to which the selected performance parameters correspond is the different job category. Determining whether the modified workflow corresponds to a different job category may include, for example, analyzing attributes and values in the workflow, and using semantic reasoning to select, for a knowledge base, a job category that is associated with at least one of the attributes in the workflow. If multiple job categories are associated with at least one of the attributes in the workflow, the method also may include selecting the job category that corresponds to a highest number of words in the workflow. Alternatively, the method may include displaying the plurality of job categories on the dashboard so that an operator may select a job category from the plurality of job categories.

In an alternate embodiment, a method of monitoring workflow performance includes receiving a process parameter selection for a job in a production process, classifying the job into a category based on the process parameter selection, selecting a workflow that corresponds to the category, accessing a knowledge base to identify performance indicators that correspond to the category, implementing the workflow via at least one production process resource, and displaying a plurality of process parameters corresponding to the resource, wherein at least a portion of the displayed process parameters include the performance indicators. Optionally, the classifying may include analyzing a plurality of attributes in the process parameter selection and using semantic reasoning to select, from a knowledge base, a job category that is associated with at least one of the attributes in the process parameter selection. Optionally, the displaying may include offering an operator both: (i) an option to display a set of parameters corresponding to the entire production process environment, and (ii) an option to display a set of parameters corresponding to an individual resource within the entire production process environment.

After the selection of the workflow and before the selection of performance indicators, the method may include presenting an operator with process options receiving a process option selection from the operator, modifying the workflow to include the process option selection, and determining whether the workflow, after modification, corresponds to a different category, and if so, reclassifying the job into the different category so that the category to which the selected performance parameters correspond is the different category. Determining whether the modified workflow corresponds to a different category may include analyzing a plurality of attributes in the workflow, and using semantic reasoning to select, from a knowledge base, a category that is associated with at least one of the attributes in the workflow.

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

The term "job" as used herein refers to the instructions and parameters pursuant to which an item is processed in a production environment. For example, in an assembly line environment, a "job" can refer to the set of materials selected, processes applied, process parameters, machines used, and other data required to determine how a product is produced or otherwise processed on all or part of the assembly line. In a printing environment, a "job" refers to one or more documents to be printed or processed and one or more instructions regarding, how to process the documents. Exemplary jobs in a printing environment include, without limitation, assembling a printed periodical or book, putting together a bound presentation, printing and cutting business cards, or the like.

An "operation" is a portion of a job that is performed. Exemplary operations for document processing in a printing operation include, without limitation, printing, cutting, folding, binding, and the like.

The terms "print shop" or "printing environment" as described herein any environment in which multiple document production devices are networked or configured to provide a document assembly environment within which documents can be printed, cut, finished, coated, bound, assembled, or otherwise created to form a variety of document types.

A "resource" is a machine that performs an operation. For example, a printing operation can be performed on a resource, such as a printer. Other exemplary resources include, without limitation, scanners, fax machines, cutting machines, binding machines, folding machines and the like. A resource may perform more than one operation for a particular job, such as a machine that folds and cuts paper, or a multi-function device that prints a document and also performs one or more finishing activities on the document, such as coating, cutting, sorting, binding, or other activities.

Figure 1:
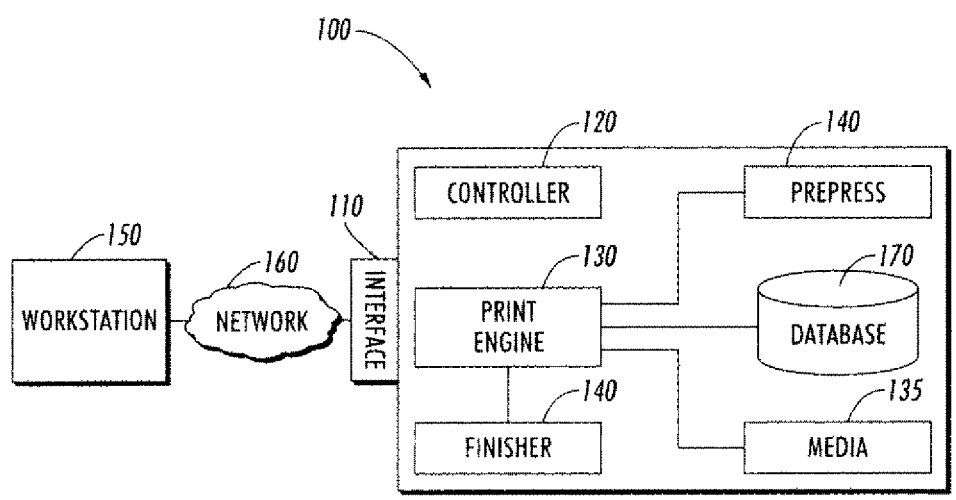
FIG. 1 illustrates exemplary elements of a production process monitoring system.

FIG. 1 illustrates components of a system 100 that may be used in accordance with carrying out the embodiments described herein. Although FIG. 1 illustrates a system in a printing environment, any production environment may be used in the embodiments described herein. A printing environment system 100 may include features such as a user interface 110, a print engine 130, and a controller 120 that controls the various resources within the system 100. The print engine 130 or other resources may have access to a media supply 135, which supplies paper or other material on which content is to be printed. The system 100 also may include one or more prepress services 140, such as software or devices that perform image processing, document size selection or other features. The system 100 also may include one or more finishing services, such as software or devices that perform sorting, cutting, finishing or other post-printing services. A user may access the system via a user interface 110 or, in some embodiments, a user workstation 150 which may include a stand-alone or portable computing or display device that is in communication with the system 100 via a communications network 160 such as a wired or wireless network.

Figure 2:
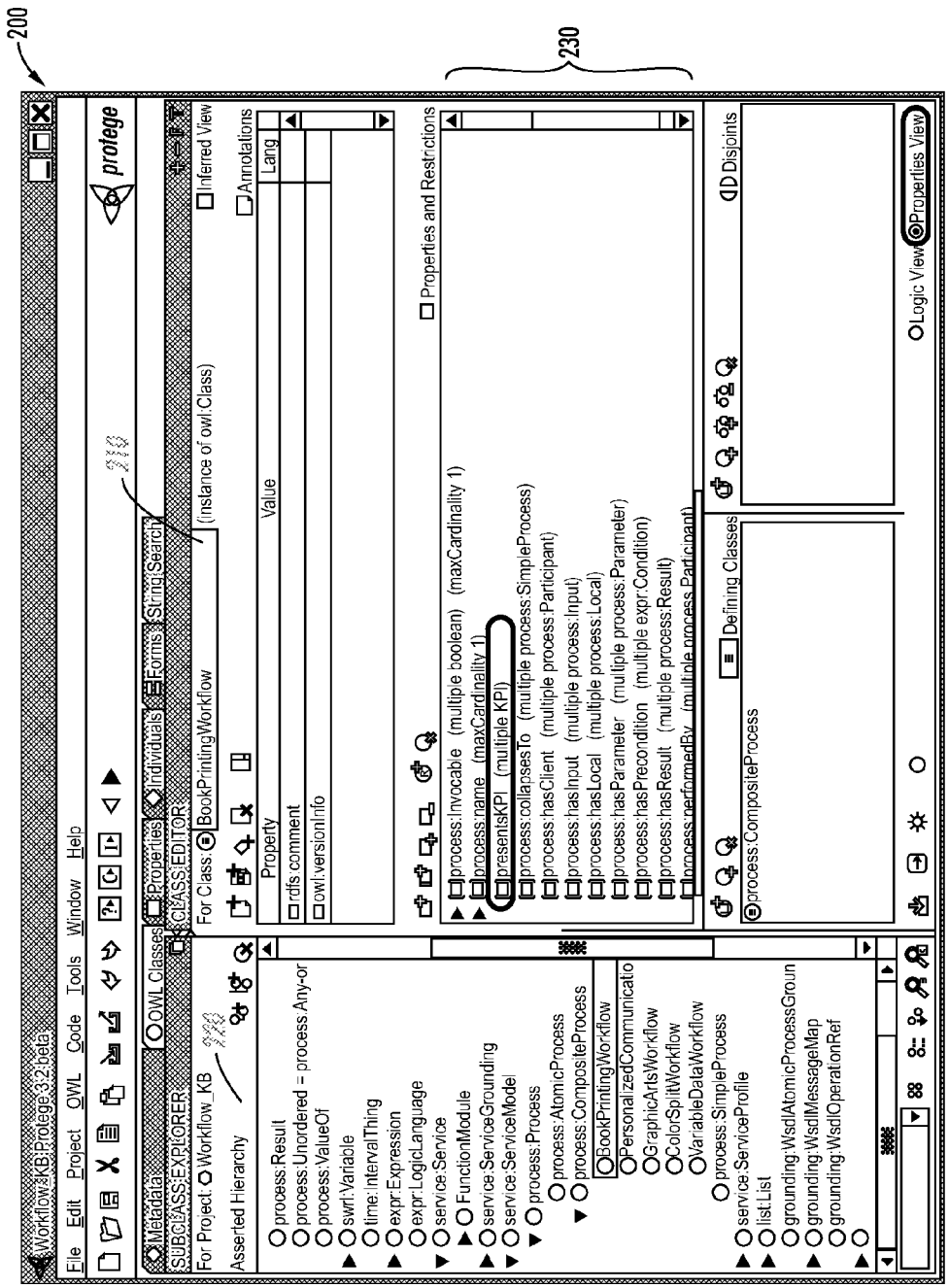
FIG. 2 illustrates an exemplary production process dashboard.

The user interface 110, workstation 150, or both may include a display on which a dashboard provides an operator with a visual view into the system in order to better manage and monitor activities of the system. FIG. 2 illustrates an example of a dashboard 200 for a printing environment. The dashboard provides a graphic user interface on which key performance indicators (KPIs) of historic and actively running jobs can be viewed and managed. The types of jobs may be displayed and selected by an operator via drop-down menus or other input mechanisms by class 210 and subclass 220. A class is a set that contains types of jobs. For example, in a printing environment, a class my include a type of document to be processed or printed, such as "book" "magazine", "brochure" or other document. Subclasses may include subsets of a job type. For example, if "book" is the selected class, available subclasses may include categories such as "paperback", "hardcover", "pocket size", "oversize" or other categories. As used herein, an operator refers to any person or device that uses a dashboard to make a selection corresponding to the production process that is displayed on the dashboard.

A class and subclass can be linked to a workflow (i.e., a set of processing instructions) and a desired output type (i.e., a description of the intended resulting product), and the process description and resulting product description may be stored in a knowledge base, such as a database (e.g., element 170 in FIG. 1). For each subclass, a set of KPIs may be stored in the knowledge base so that the KPIs may be displayed on the dashboard when that subclass is selected. For example, referring to FIG. 2, for a book printing class 210 and composite workflow 220 a set of KPIs 230 may be displayed.

Figure 3:
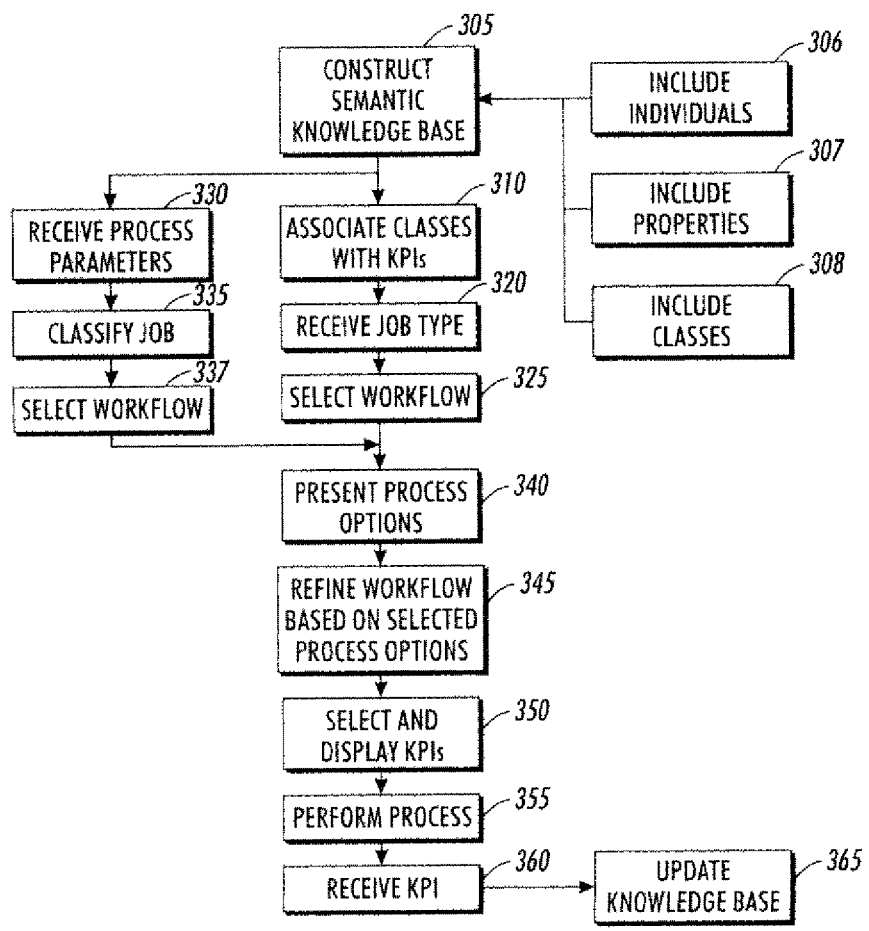
FIG. 3 illustrates exemplary steps in a method of selecting dynamic key performance indicators for display in a production process.

FIG. 3 illustrates exemplary elements that may be included in the use of KPIs in a production process monitoring system. Referring to FIG. 3, a semantic knowledge base may be available or constructed (step 305). The knowledge base may be in the form of an ontology such as web ontology language (OWL), which is released by the World Wide Web Consortium, or another format that allows for the description of both concepts and relationships between concepts. The knowledge base may include individuals 306, properties 307, and classes 308. Individuals are the objects of interest in the database—such as a job in a production process. Properties are relations that link two individuals together, such as linking a subclass of "paperback" or a class of "book." Classes are sets that contain individuals having attribute values for membership in a class. Classes are further divided into subclasses that are organized into a taxonomy, or a semantic hierarchy in which the relation between a class and a subclass may be defined by its attributes. As used herein, the term "category" is intended to refer interchangeably to a class, subclass or both a class and subclass taken together.

For example, in a print shop environment, a individual job (e.g., an instruction set to print a particular book) may have certain properties (such as binding instructions, color selection, or other features) that are common with all softcover books (i.e., a subclass of the "books" class). Some or all of the subclasses in the knowledge base are then associated with one or more KPIs (step 310) that represent a performance-related variable that is of interest as the individual job proceeds through the process. Examples of KPIs for individual jobs may include a number of pages completed in the job, a number of pages yet to be completed in the job, an indicator of whether binding has been completed, an indicator of how much toner a job uses, or other indicators of the progress of the job. KPIs for historical groups of jobs associated with a particular category include throughput efficiency, utilization efficiency, and quality. KPIs also can be associated with expected metrics, such as the expected progress of a variable over time, to determine whether a particular job or group of jobs is deviating from the expected norm for the job type.

Figure 4:
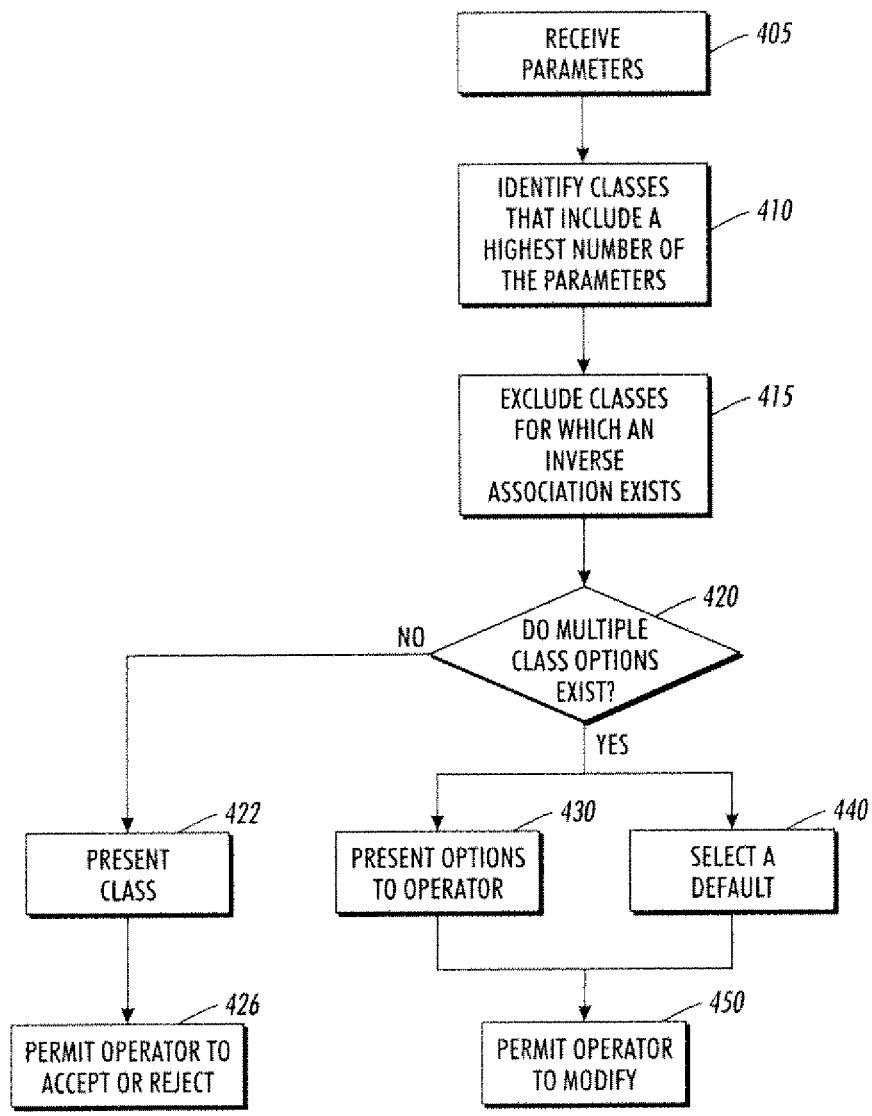
FIG. 4 illustrates exemplary steps in a semantic reasoning process.

When the semantic knowledge base is available, the production process may then receive a job. Upon receipt, an operator or automated input system may provide, and the process monitoring system may receive, a job type (step 320). Although the manual selection of a job type is not required, when a job type is received the system-n may retrieve workflow instructions corresponding to that job type from a memory (step 325), such as a database. Based on the workflow instructions, the system may then present, on a display or other output device, one or more process options (step 340) for an operator to select. For example, in a print shop environment, if an operator selects a job type as "magazine", the system may present the operator with options for paper size (e.g., standard or oversize), paper finishing type (e.g., glossy or matte surface) or other options. For each option, a default selection may be available if the user does not make a selection for that option. The system may then refine the workflow (step 345) by modifying it to include the selected and/or default process options, and the workflow may then be performed to create the product in the production process (step 350). When the workflow is refined, the job may be reclassified using semantic reasoning to identify a job class corresponding to the modified workflow. Exemplary semantic reasoning methods are described below in the discussion relating to FIG. 4.

Alternatively, instead of selecting a job type, the system may receive, or an operator may directly select, one or more parameters describing the activities that the production process must perform on a job (step 330). For example, in a print shop environment, job definition format (JDF) may be used as a language to describe a desired product and the processes that are to be performed to create the product. The parameters, which also may be referred to as process variables, may include process steps such as binding or collating. Process variables also may include the selection of printing, finishing, paper selection, or related options, such as type of print (e.g., black-and-white or color), paper size, or coating options. The process variables are also referred to herein as attributes of the workflow, and they contain values and define activities that will occur as the job proceeds through the production process.

As examples, an attribute of a document creation workflow may include "binding" or "media color," Based on the process parameters selected, the system may classify the job by job type (step 335) and then select a workflow corresponding to the classified job type (step 337). The workflow may include the process parameters provided at the outset (from step 330), and optionally the operator may be presented with additional process options (step 340).

In the option where the system classifies the job by job type (step 335), in some embodiments the system may use semantic reasoning to perform this classification. For example, a reasoning engine, which may be a software module that analyzes attributes included in the process parameters, may determine what job types are associated with one or more attributes and values of the process parameters, and using any now or hereafter known semantic reasoning methods it may choose a job type in which the job will be classified. For example, referring to FIG. 4, based on the received parameters (step 405) the system may identify those classes in the knowledge base that include the highest number of selected parameters (step 410). For example, in a printing environment, if the operator-selected process parameters that include a media size of less than 4 inches by 4 inches, no binding, and no cover, the reasoner may analyze these attribute restrictions and determine that the parameters are all found in the expected workflow for a postcards. However, the reasoner also may determine that the same parameters are included in a "business card" job class. If so, then the reasoner may determine whether the selected parameters include any parameters having an inverse relationship with the potential classes, and if so, then the reasoner may determine that tile job should not be placed in that class (step 415). Continuing the example above, if the parameters include a document size of 3 inches by 2.5 inches, the system may determine that the size is expressly excluded from the "postcards" workflow, and thus the system will not classify the job as a postcard. After this process, if the reasoner determines that there is only one potential classification for the job (step 420), the system may classify the job according to that class (step 422), and the operator may be given the opportunity to accept or reject that class (step 424). Alternatively, if the system determines that multiple classes are possible (step 420), the system may present the options to the operator for selection (step 430), or the system may select a default class (step 440) based on any predetermined criteria. In either case, the user may also be given the opportunity to select, accept or reject the class in some embodiments (step 450).

Returning to FIG. 3, after the job is classified the systems may select a set of KPIs based on the selected class or subclass corresponding to the Job (step 350). The KPIs may be stored in the knowledge base, and the KPIs may be displayed on the dashboard either automatically or selectively in response to operator requests. Each set of KPIs is unique to a class or subclass, and thus the selection of KPIs is based on the one-to-one relation of a class or subclass and its KPI set. Optionally, before or while the job is executed (step 355), an operator may select one or more additional performance indicators for display on the dashboard (step 360). When the system receives such a request, it may update the knowledge base for that class so that the operator-selected performance indicators are included in the set of KPIs for that class (step 365).

Thus, as described above, the KPIs are dynamically displayed on a dashboard based on the process parameters selected by a user. In some embodiments, KPIs associated with a class may be layered so that when the KPIs are displayed (step 350), a subset of the KPIs may be displayed at any one time. For example, when the dashboard displays parameters relating to a particular resource in a production process, the displayed KPIs may include KPIs that are specific to that resource and the relevant job class. Alternatively, when the dashboard displays an overview of the entire production process, a general set of KPIs may be displayed, and one or more device-specific KPIs may be removed from the display.

In some embodiments, the automatic selection and user refinement of KPIs may be performed while a job is being executed. In other embodiments, either or both of these activities may be done while a job is in queue (i.e., before execution), or the activities may be done for historic evaluation of groups of jobs after the jobs have been executed.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of monitoring workflow performance comprising:
    receiving, via a user interface, a process parameter selection for a job in a production process;
    classifying, by a controller, based on the process parameter selection, the job into a type category, wherein the job type category is indicative of an output that results from processing the job;
    selecting, by the controller, a workflow that corresponds to the job type category;
    presenting an operator with a plurality of process options;
    receiving, from the operator, a process option selection;
    modifying the workflow to include the process option selection;
    determining whether the workflow, after modification, corresponds to a different job type category, and if so, reclassifying the job into the different job type category so that the job type category to which the identified performance parameters correspond to the different job type category;
    accessing, by the controller, a knowledge base to identify a plurality of performance indicators that are unique to the different job type category, wherein each performance indicator represents a performance-related metric associated with processing the job;
    implementing the workflow via at least one production process resource; and
    displaying a plurality of process parameters corresponding to the resource, wherein at least a portion of the displayed process parameters include the plurality of performance indicators.

2. The method of claim 1, wherein the classifying comprises:
    analyzing a plurality of attributes in the process parameter selection; and
    using semantic reasoning to select, from a knowledge base, the job type category that is associated with at least one of the attributes in the process parameter selection.

3. The method of claim 1, wherein the displaying comprises offering an operator both:
    an option to display a set of parameters corresponding to the entire production process environment; and
    an option to display a set of parameters corresponding to an individual resource within the entire production process environment.

4. The method of claim 1, wherein the determining whether the modified workflow corresponds to the different job type category comprises:
    analyzing a plurality of attributes in the workflow; and
    using semantic reasoning to select, from a knowledge base, the job type category that is associated with at least one of the attributes in the workflow.

5. The method of claim 4 wherein, when a plurality of job type categories are associated with the at least one of the attributes in the workflow, the method further comprises selecting the job type category that corresponds a highest number of attributes in the workflow.

6. The method of claim 4 wherein, if a plurality of job type categories are associated with at least one of the attributes in the workflow, the method include displaying the plurality of job type categories on the dashboard so that an operator may select a job category from the plurality of job type categories.

7. The method of claim 1, wherein:
    the production process comprises a printing environment;
    the job comprises a print job;
    the workflow comprises instructions for printing the print job using at least one resource in the printing environment; and
    the performance indicators comprise at least one of a page count and toner usage.

8. The method of claim 1, wherein accessing, by the controller, the knowledge base to identify the plurality of performance indicators comprises identifying a performance indicator associated with an expected metric for the job type category.

9. The method of claim 8, further comprising determining whether a value of a performance indicator in the plurality of performance indicators deviates from the expected metric.

10. The method of claim 1, wherein accessing, by the controller, the knowledge base to identify the plurality of performance indicators comprises identifying one or more of the following:
    a number of pages completed in the job;
    a number of pages yet to be completed in the job;
    an indicator of whether a binding has been completed; and
    an indicator of how much toner a job uses.

11. The method of claim 1, further comprising, after accessing a knowledge base and before implementing the workflow:
    receiving a performance indicator from a user, wherein the received performance indicator is not included in the plurality of performance indicators; and
    updating the plurality of performance indicators in the knowledge base that correspond to the job type category or the different job type category to include the received performance indicator.

12. A method of monitoring workflow performance comprising:
    selecting, by a controller, a workflow for a job in a production process environment, wherein the job corresponds to a first job type category;
    receiving, via a user interface, a process option selection;
    modifying the workflow to yield a modified workflow that includes the process option selection;
    determining, by the controller, whether the modified workflow corresponds to a second job type category, and if so, reclassifying the job into the second job type category;
    accessing, by the controller, a knowledge base to automatically select a set of performance indicators that uniquely correspond to the second job type category, wherein each performance indicator represents a performance-related metric associated with processing the job;

displaying, on a dashboard, a plurality of process parameters corresponding to the production process, wherein at least a portion of the displayed process parameters include the selected performance indicators; and performing the job in the production process environment.

13. The method of claim 12, further comprising:

receiving, from an operator, a desired process parameter selection for the job; and modifying the knowledge base so that the set of performance indicators corresponding to the second job category include the desired process parameter selection.

14. The method of claim 12, wherein the determining whether the modified workflow corresponds to the second job category comprises:

analyzing a plurality of attributes and values in the workflow; and using semantic reasoning to select, from a knowledge base, a job category that is associated with at least one of the attributes in the workflow.

15. The method of claim 12, wherein the displaying comprises offering an operator both:

an option to display a set of parameters corresponding to the entire production process environment; and an option to display a set of parameters corresponding to an individual resource within the entire production process environment.

* * * * *